Figure 1:
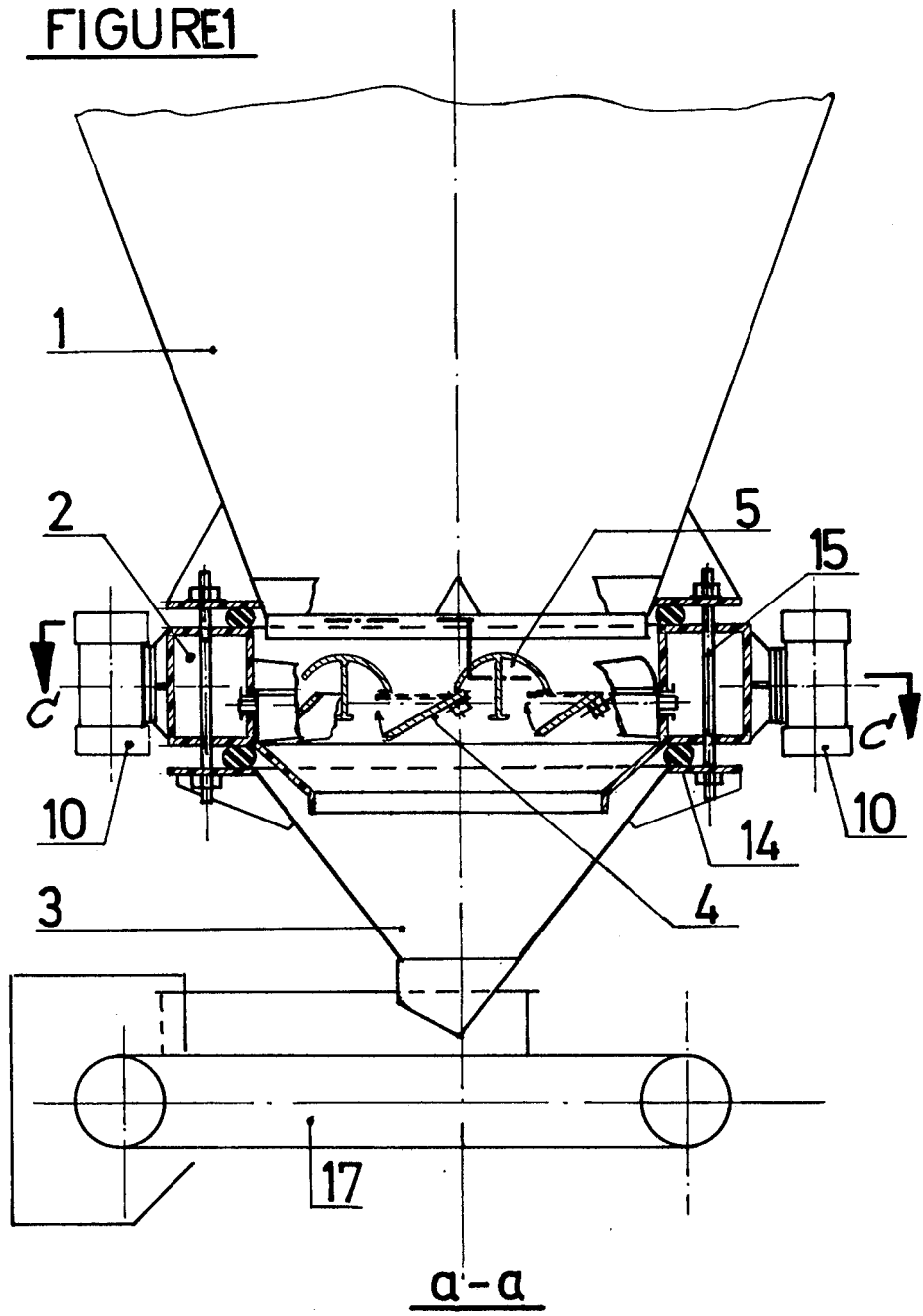

United States Patent [19]
Blinn

[11] 4,105,143
[45] Aug. 8, 1978

[54] DEVICE FOR DISCHARGING BULK MATERIAL

[75] Inventor: Ludwig Blinn, Spiesen, Germany

[73] Assignee: Pohlig-Heckelbleichert Vereinigte Maschinenfabriken Aktiengesellschaft, Cologne-Zollstock, Germany

[21] Appl. No.: 765,312

[22] Filed: Feb. 3, 1977

[30] Foreign Application Priority Data

May 2, 1976 [DE] Fed. Rep. of Germany ....... 2604327

[51] Int. Cl.² .......................................... B65G 27/18
[52] U.S. Cl. ............................................... 222/161
[58] Field of Search ............... 222/161, 196, 198, 199, 222/200; 198/533; 193/2 B

[56] References Cited
U.S. PATENT DOCUMENTS

| 3,178,068 | 4/1965 | Dumbaugh | 222/161 |
| 3,501,062 | 3/1970 | De Witt et al. | 222/161 |

Primary Examiner—Stanley H. Tollberg
Attorney, Agent, or Firm—Karl W. Flocks

[57] ABSTRACT

An upper hopper is adapted to receive bulk material. A lower hopper is disposed under said upper hopper and adapted to receive bulk material from the upper hopper and to deliver said bulk material. A substantially cylindrical, rigid connecting ring is disposed between and resiliently connected to said upper and lower hoppers and defines a flow path between them. A plurality of blades which are angularly spaced apart in a horizontal plane are supported by said connecting ring at fixed points thereof and extend substantially radially in said flow path. At least two vibration machines are mounted on said connecting ring and operable in the same sense of rotation to impart sinusoidally varying, angular oscillations to said connecting ring.

20 Claims, 6 Drawing Figures

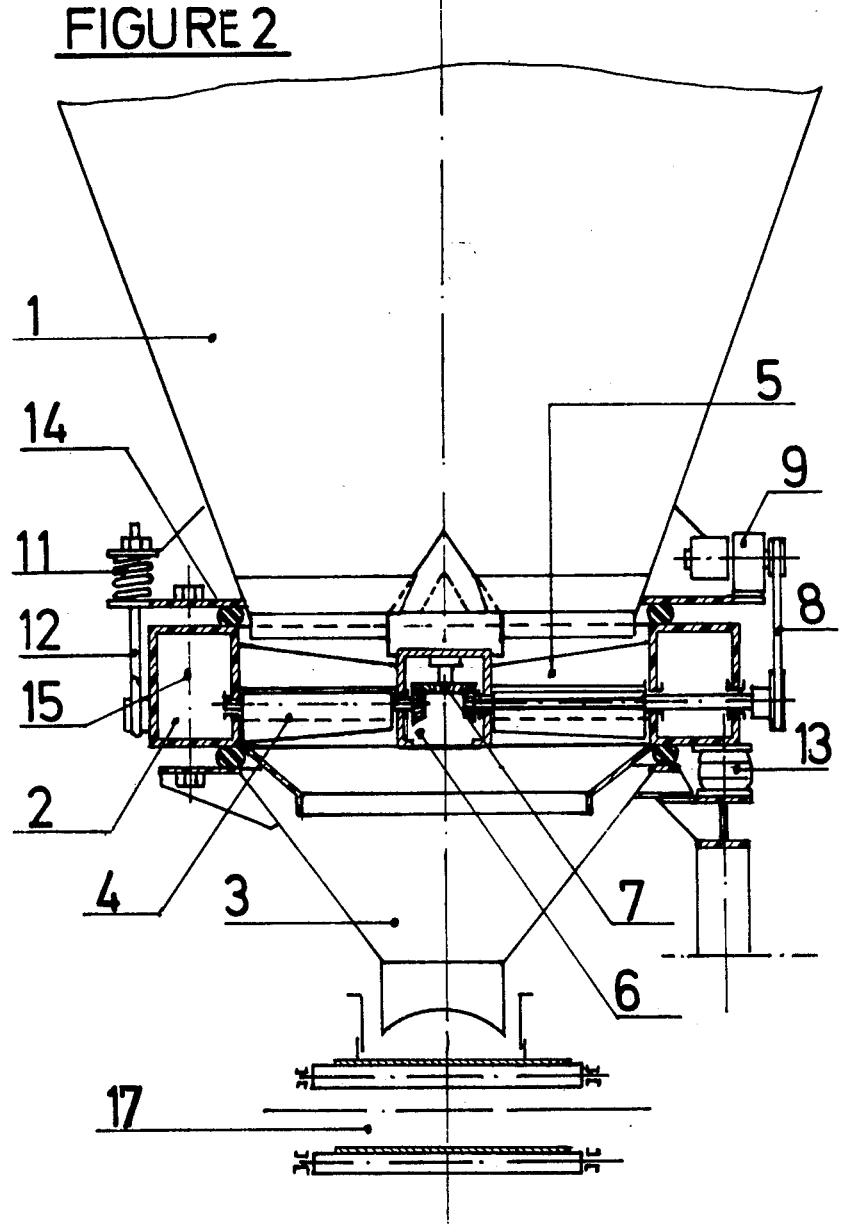

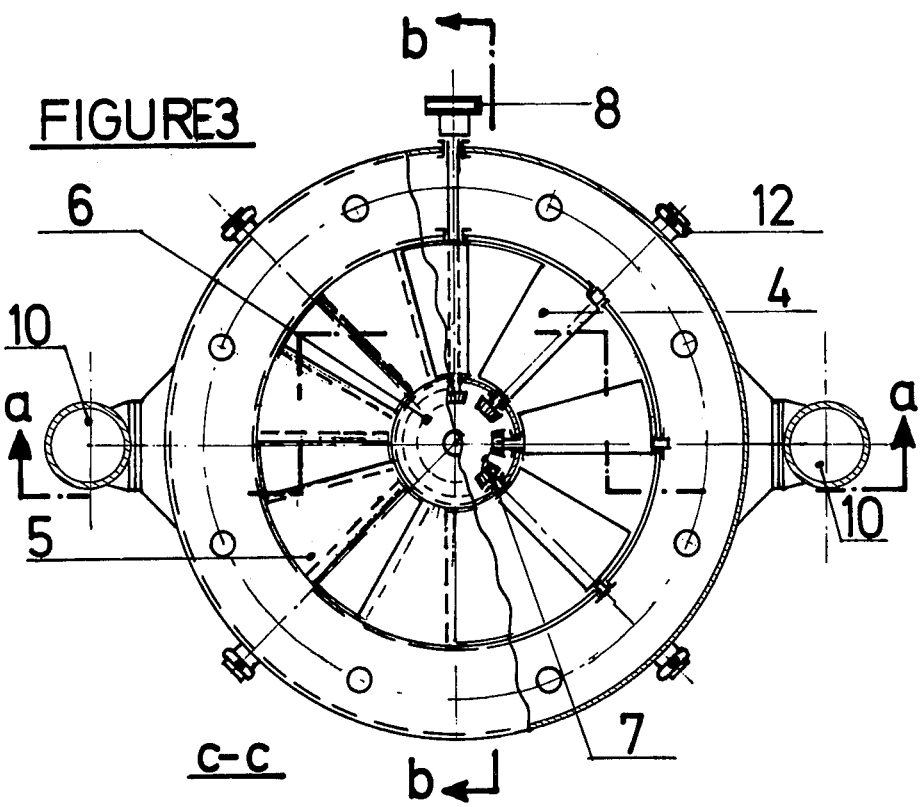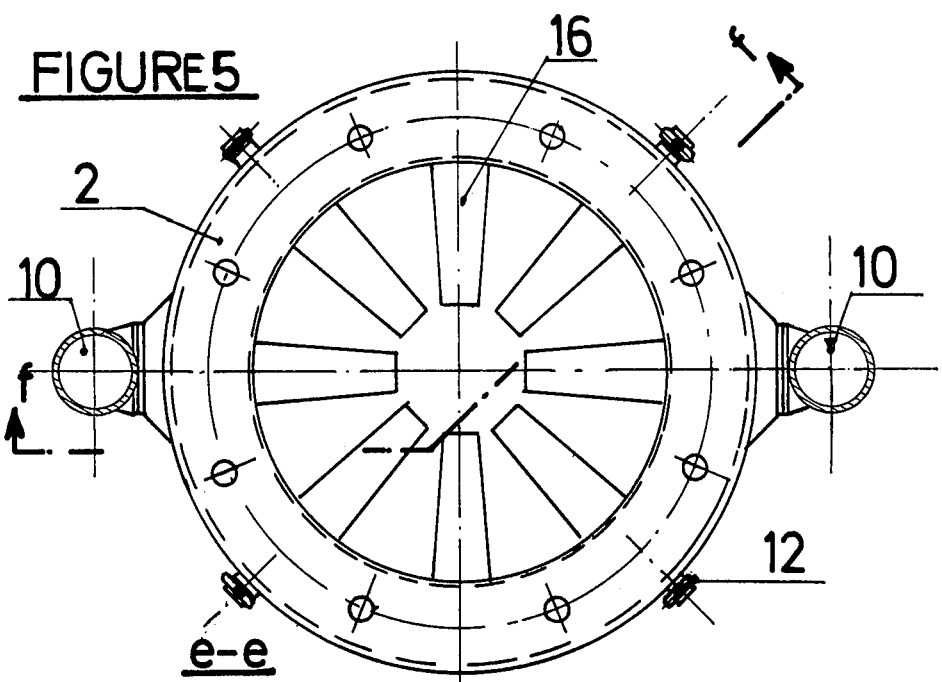

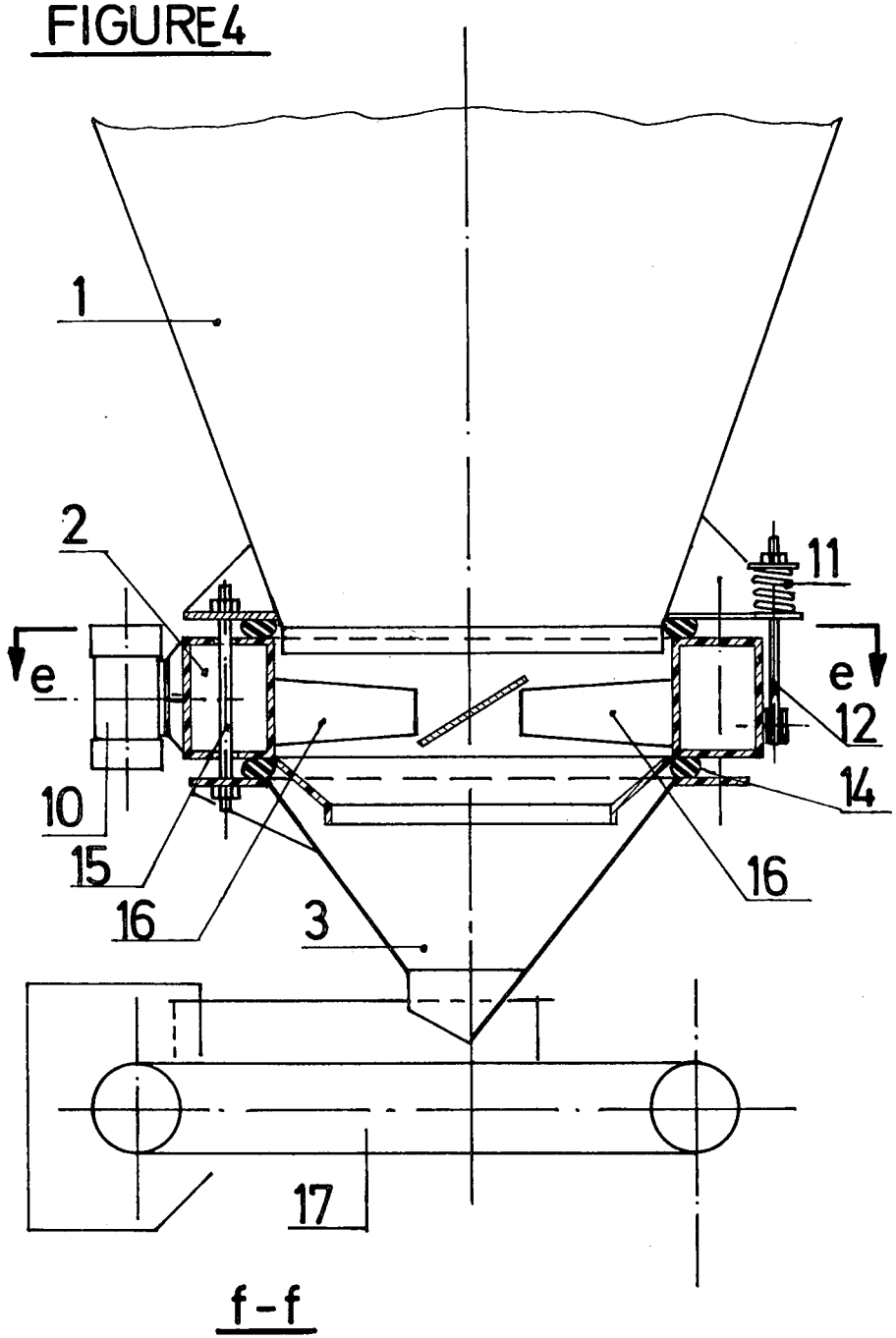

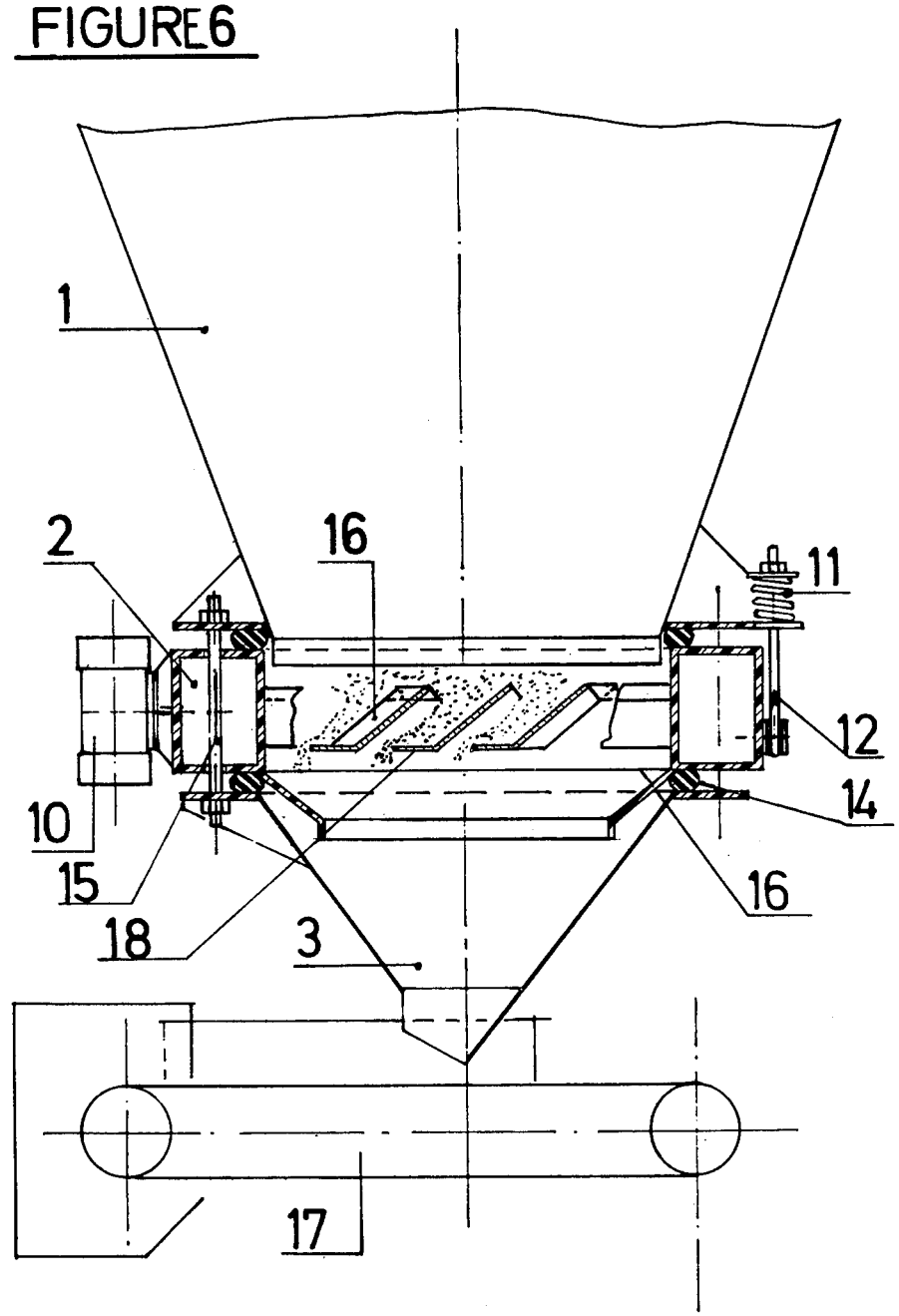

DEVICE FOR DISCHARGING BULK MATERIAL

This invention relates to a device for discharging bulk material from a bin, particularly for discharging bulk material at a metered rate onto a succeeding belt conveyor or the like, comprising a hopper structure and vibration machines mounted on the hopper structure.

A bin discharge device of that kind has been disclosed in U.S. Pat. No. 3,178,068 and comprises upwardly inclined vibration machines, which comprise rotatable unbalanced masses and are mounted on the conical portion of the device and impart helical vibrations to the conical outlet portion. The entire hopper structure must be vibrated.

In another bin discharge device, which has been disclosed in German Pat. No. 1,266,231 and comprises also vibration machines comprising rotatable unbalanced masses, vibration is imparted to an arcuate bottom provided in the lower part. That device has also the disadvantage that the entire column of bulk material rests on the hopper structure and its support. Whereas it is also desired to prevent a compaction of and arching in the material, this cannot be precluded. A continuous trickling flow is not ensured, particularly when the bulk material is sticky or does not trickle easily.

Other known devices include rapping devices and inflatable rubber cushions for use in bins. The known devices are intended for use in relatively small bins to be discharged at a relatively low rate.

It is an object of the invention to provide a device which is of the kind defined first hereinbefore and in which the disadvantages of the known devices for discharging bulk material are avoided and which enables a continuous discharge of bulk material, even if it is sticky or does not easily trickle, at a high rate and ensures that the bulk material will not arch and will not be retained.

This is accomplished according to the invention in that the hopper structure comprises an upper hopper for receiving bulk material an a lower hopper for discharging bulk material, these two hoppers are resiliently interconnected by a substantially cylindrical, rigid connecting ring, radial blades, which are angularly spaced apart in a horizontal plane and are pivotally movable about their respective axes, extend in said connecting ring, and at least two vibration machines comprising rotatable unbalanced masses or exciting solenoids are mounted on the connecting ring in such a manner that the angular vibration-exciting means are actuated in the same sense of rotation to impart to the connecting ring a sinusoidally varying angular oscillation.

In a preferred embodiment of the invention, the blades are pivotally mounted at their inner ends in a centrally disposed gear housing, which contains a bevel gearing, and the blades are interconnected by chains or the like of a chain drive and are adjustable by means of an adjusting mechanism or by hand in such a manner that the blades are moved to a steep or vertical orientation when a maximum discharge rate is desired and are moved to a predetermined inclination for a discharge at a metered rate.

In an embodiment of the invention it has been found that the connecting ring is suitably resiliently mounted by means of adjustable suspension spring arrangements connected to the upper hopper and comprising hanger rods and/or by means of resilient supports carried by the lower hopper.

Sealing rings of rubber or the like are suitably provided between the connecting ring, on the one hand, and the upper and lower hoppers, on the other hand.

It may be recommendable to resiliently connect the upper hopper to the lower hopper by means of the connecting ring, rubber seals provided on the connecting ring, and hanger bolts.

According to another feature of the invention, the radial blades in the connecting ring are rigidly connected thereto and the connecting ring elastically connects the upper hopper to the lower one and is provided with at least two vibration machines comprising rotatable unbalanced masses.

Further advantages and features of the invention will become apparent from the following description of embodiments shown by way of example on the accompanying drawings, in which FIG. 1 is a front elevation showing partly in section a device comprising pivoted blades in the connecting ring, FIG. 2 is a vertical sectional view on a plane extending through the center of the device of FIG. 1, FIG. 3 is a top plan view showing the device of FIG. 1, partly in section, FIG. 4 is a front elevation showing partly in section a device which comprises rigid blades in the connecting ring, FIG. 5 is a top plan view showing the device of FIG. 5, and FIG. 6 is a front elevation showing another modification.

The device for discharging bulk material from a bin includes a hopper structure, which comprises an upper hopper 1 for receiving bulk material and a lower hopper 3 for delivering bulk material to a succeeding belt conveyor 17 or the like. The two hoppers are resiliently connected by a substantially cylindrical connecting ring 2. Radial blades 4 are relatively closely angularly spaced apart in a horizontal plane and extend in said connecting ring 2 and are pivoted thereto on and angularly adjustable about fixed axes.

The connecting ring 2 is resiliently mounted, e.g., hung into a suspension spring arrangement 11, which comprises hanger rods 12 and is secured to the upper hopper 1, and on resilient supports 13 carried by the lower hopper. The connecting ring 2 is provided with a supporting structure 5, which carries gear bearings and a cover for the free space.

In one embodiment of the invention, the blades 4 which are pivoted to the connecting ring 2 are pivoted at their inner end in a centrally disposed gear housing 6 and connected to bevel gears of a bevel gearing 7. One of the blades is positively or non-positively connected to a chain or the like of a chain drive 8. The blades 4 can be adjusted by hand or by power-actuated drive means 9. For a discharge substantially at a maximum rate, the blades 4 are moved to a steep or vertical position to enable the material to flow freely between the blades. For a discharge at a metered rate, the blades 4 are moved to a position in which they are inclined at a suitable angle α.

To avoid a raising of dust, the connecting ring 2 is provided on its top and bottom surfaces with seals 14 of rubber or the like, which are preferably disposed on the inside circumference of the connecting ring 2. The lower hopper 3 is provided with suspension bolts 15. At least two vibration machines 10, which comprise rotatable unbalanced masses or exciting solenoids, are mounted on the connecting ring, e.g., at diametrically opposite points. Depending on the nature of the bulk material, the vibration machines 10 which comprise rotatable unbalanced masses or exciting solenoids are operated continuously or intermittently. In dependence on the requirements, the vibration machines comprising rotatable unbalanced masses may have a vertical or inclined orientation.

Owing to the arrangement which has been described, the connecting ring 2 has the function of a vibrating ring. The vibration is imparted by the blades 4 to the bulk material which is contained in the connecting ring so that this material is uniformly discharged through the lower hopper.

In another embodiment, radial blades 16 are rigidly connected to the connecting ring 2.

In the described embodiments of the invention, the flow of material is arrested at the lower hopper when the vibration machines are not operated. To keep the lower hopper free of bulk material, when this is required, e.g., when certain work is to be performed at the belt or the lower hopper, an additional feature of the invention resides in that the rigid blades 16 are provided with substantially horizontal flanges 18, which support the bulk material during a standstill.

Each flange 18 has a free edge 19, which defines a gap with an adjacent blade. This arrangement ensures that the flow of material will be arrested adjacent to the connecting ring during a standstill and that the material will flow constantly through the gaps between the free edges of the flanges and the blades during operation.

The mode of operation is as follows:

The vibration machines which comprise rotatable rotating masses or exciting solenoids are actuated in the same sense of rotation to impart sinusoidally varying angular oscillations to the connecting ring provided with the blades so that the angular oscillations are transmitted to the blades. The bulk material which has been received by the upper hopper is partly supported by the blades and is vibrated adjacent thereto so that the material is uniformly discharged from the lower hopper onto a succeeding belt conveyor, even at high rates.

What is claimed is:

1. A device for discharging bulk material, which comprises
   an upper hopper adapted to receive bulk material,
   a lower hopper disposed under said upper hopper and adapted to receive bulk material from the upper hopper and to deliver said bulk material,
   a substantially cylindrical rigid connecting ring disposed between and resiliently connected to said upper and lower hoppers and defining a flow path between them,
   a plurality of blades, which are angularly spaced apart in a horizontal plane and supported by said connecting ring at fixed points thereof and extend substantially radially in said flow path, and
   at least two vibration machines mounted on said connecting ring and operable in the same sense of rotation to impart sinusoidally varying, angular oscillations to said connecting ring.

2. A device as set forth in claim 1, which comprises a bin for delivering bulk material to said upper hopper.

3. A device as set forth in claim 1, which is operable to discharge bulk material at a metered rate.

4. A device as set forth in claim 1, which comprises a belt conveyor for receiving bulk material from said lower hopper.

5. A device as set forth in claim 1, in which said vibration machines comprise rotatable unbalanced masses.

6. A device as set forth in claim 1, in which said vibration comprise exciting solenoids.

7. A device as set forth in claim 1, in which said blades are pivoted to said connecting ring on pivotal axes and are angularly adjustable about said axes.

8. A device as set forth in claim 7, which comprises an adjusting mechanism for angularly moving said blades in unison between a steep position for a discharge of bulk material at a higher rate and a less steep position for a discharge of bulk material at a lower rate.

9. A device as set forth in claim 8, in which said adjusting mechanism is adapted to move said blades to a vertical position.

10. A device as set forth in claim 8, in which said adjusting mechanism comprises power-operable drive means.

11. A device as set forth in claim 8, in which
    said adjusting mechanism comprises a gear housing centrally disposed in said flow path and containing bevel gearing and
    said blades extend into said housing and are operatively connected to said bevel gearing for an angular movement of said blades in unison.

12. A device as set forth in claim 11, in which said adjusting mechanism comprises a chain drive connected to one of said blades and operable to impart an angular movement to said one blade and by means of said bevel gearing to the other of said blades.

13. A device as set forth in claim 8, in which said adjusting mechanism comprises a chain drive comprising a chain trained around one of said blades.

14. A device as set forth in claim 1, in which said connecting ring is resiliently connected to said upper hopper by adjustable spring suspension mechanisms, which are carried by said upper hopper and comprise hanger rods connected to said connecting ring.

15. A device as set forth in claim 1, in which said connecting ring is resiliently connected to said lower hopper by resilient supports carried by said lower hopper.

16. A device as set forth in claim 1, which comprises elastic sealing rings provided between said connecting ring and said upper hopper and between said connecting ring and said lower hopper.

17. A device as set forth in claim 14, in which said sealing rings consist of rubber.

18. A device as set forth in claim 16, which comprises hanger bolts which cooperate with said sealing rings to resiliently connect said connecting ring to said upper and lower hoppers.

19. A device as set forth in claim 1, in which said blades are rigidly connected to said connecting ring.

20. A device as set forth in claim 19, in which a substantially horizontal strip is associated with each of said blades and has a free side edge, which is designed to define such a gap with the next adjacent one of said blades that a flow of material through said gaps is ensured when, and only when, said vibrating machines are operated.

* * * * *